United States Patent
Hall et al.

(10) Patent No.: US 6,256,731 B1
(45) Date of Patent: *Jul. 3, 2001

(54) METHOD AND APPARATUS FOR SETTING THE OPERATING PARAMETERS OF A COMPUTER SYSTEM

(75) Inventors: Jerald N. Hall, Scappoose; Orville H. Christeson, Hillsboro; Mike Kinion, Hillsboro; Sean R. Babcock, Portland; Frank L. Wildgrube; Frank E. LeClerg, both of Hillsboro, all of OR (US); John Yuratovac, Rancho Cucamonga, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/440,150

(22) Filed: Nov. 15, 1999

Related U.S. Application Data

(63) Continuation of application No. 08/940,636, filed on Sep. 30, 1997, now Pat. No. 6,047,373, which is a continuation-in-part of application No. 08/778,304, filed on Jan. 2, 1997, now Pat. No. 5,968,140.

(51) Int. Cl.$^7$ .................. G06F 9/00; G06F 9/44
(52) U.S. Cl. .................. 713/1; 713/2; 713/501
(58) Field of Search .................. 713/1, 2, 100, 713/500, 501, 600

(56) References Cited

U.S. PATENT DOCUMENTS

| | | |
|---|---|---|
| 4,940,909 | 7/1990 | Mulder et al. . |
| 4,980,850 | 12/1990 | Morgan . |
| 5,014,191 | 5/1991 | Padgaonkar et al. . |
| 5,051,588 | 9/1991 | Agano . |
| 5,107,455 | 4/1992 | Haines et al. . |
| 5,173,904 | 12/1992 | Daniels et al. . |
| 5,267,309 | 11/1993 | Sanders et al. . |
| 5,325,532 | 6/1994 | Crosswy et al. . |
| 5,388,267 | 2/1995 | Chan et al. . |
| 5,418,778 | 5/1995 | Cummiskey et al. . |
| 5,479,618 | 12/1995 | Van De Steeg et al. . |
| 5,504,905 | 4/1996 | Cleary et al. . |
| 5,517,646 | 5/1996 | Piccirillo et al. . |
| 5,572,707 | 11/1996 | Rozman et al. . |
| 5,579,522 | 11/1996 | Christeson et al. . |
| 5,606,715 | 2/1997 | Yishay et al. . |
| 5,631,850 | 5/1997 | Tanaka et al. . |
| 5,675,794 | 10/1997 | Meredith . |
| 5,721,860 | 2/1998 | Stolt et al. . |
| 5,737,235 | 4/1998 | Kean et al. . |
| 5,968,140 | * 10/1999 | Hall ........................... 710/14 |
| 6,026,231 | * 2/2000 | Tymchenko ................. 395/556 |
| 6,047,373 | * 4/2000 | Hall et al. ....................... 713/1 |

* cited by examiner

Primary Examiner—Dennis M. Butler
(74) Attorney, Agent, or Firm—Blakely, Sokoloff, Taylor & Zafman LLP

(57) ABSTRACT

An apparatus includes a configuration selector that is selectively configurable to denote one of a plurality of operating modes for the apparatus, including a configuration mode. The apparatus further comprising a programmable multiplexer, a processor, a bus, and a storage medium having stored therein a basic input/output system (BIOS) equipped to operate in any one of the plurality of operating modes, including the configuration mode wherein the BIOS facilitates user programming of a plurality of operating parameters for the apparatus. The programmable multiplexer, responsive to the configuration selector, asserts a default bus/core ratio common to a plurality of processors and buses that can be employed to form the apparatus when the configuration selector is configured to denote the configuration mode of operation. The processor, coupled to the storage medium and the programmable multiplexer, operates to execute the BIOS, in a speed consistent with the asserted bus/core ratio. The bus, coupled to the programmable multiplexer, the processor and the storage medium, operates to provide instructions and data to the processor, including the BIOS, in a speed consistent with the asserted bus/core ratio.

9 Claims, 7 Drawing Sheets

METHOD AND APPARATUS FOR SETTING THE OPERATING PARAMETERS OF A COMPUTER SYSTEM

Related Applications

This application is a continuation of application Ser. No. 08/940,636 filed Sep. 30, 1997 now U.S. Pat. No. 6,047,373 entitled "Method And Apparatus For Setting The Operating Parameters Of A Computer System" which is a continuation-in-part of application Ser. No. 08/778,304 filed Jan. 2, 1997 now U.S. Pat. No. 5,968,140 entitled "Method and Apparatus for the Programmable Configuration of Strapping Options on a Circuit Board Assembly" to Jerald N. Hall, and commonly assigned to the assignee of the present invention, the disclosure of which is expressly and fully incorporated herein by reference.

BACKGROUND OF THE INVENTION

1. Field of the Invention

The present invention relates to the field of computer systems and, in particular, to a method and apparatus for setting the operating parameters of a computer system.

2. Background Information

Computer system manufacturers have long relied on configuration selectors, e.g., jumper block assemblies, dip switches, and the like, to configure a number of operational parameters of a computer system. Examples of such operating parameters configured with a plurality of configuration selectors include the bus/core ratio, the processor clock speed, the speaker select (internal/external), the mode of operation (normal/update), password enable/disable, setup enable/disable and a number of extended system configuration parameters maintained in a complementary metal oxide semiconductor (CMOS) memory device.

Those skilled in the art will recognize that the use of configuration selectors, while enabling a printed circuit board assembly to be configured to serve different needs, adds to the cost of the printed circuit board assembly in terms of component cost for the configuration selectors, and also by consuming valuable real-estate on the printed circuit board assembly. That is to say, many of the printed circuit board assemblies employed by such prior art computer systems are laden with costly and space consuming configuration selectors to set each of the foregoing operating parameters. Thus, it would be desirable to eliminate as many of the costly and space consuming configuration selectors as possible along with the human induced configuration errors of the configuration selectors, without reducing the functionality and configurability of the printed circuit board.

Thus a need exists for a method and apparatus for setting the operating parameters of a computer system, unencumbered by the limitations associated with the prior art.

SUMMARY OF THE INVENTION

Briefly, in accordance with the teachings of the present invention, a method and apparatus for setting the operating parameters of a computer system is disclosed. In a first embodiment, an apparatus includes a configuration selector that is selectively configurable to denote one of a plurality of operating modes for the apparatus, including a configuration mode. The apparatus further includes a processor, a bus, a programmable multiplexer, and a storage medium having stored therein a basic input/output system (BIOS) equipped to operate in any one of the plurality of operating modes, including the configuration mode wherein the BIOS facilitates user programming of a plurality of operating parameters for the apparatus. The programmable multiplexer, responsive to the configuration selector, asserts a default bus/core ratio common to a plurality of processors and buses that can be employed to form the apparatus when the configuration selector is configured to denote the configuration mode of operation. The processor, communicatively coupled to the storage medium and the programmable multiplexer, operates to execute the BIOS, in a speed consistent with the asserted bus/core ratio. The bus, coupled to the programmable multiplexer, the processor and the storage medium, operates to provide instructions and data to the processor, including the BIOS, in a speed consistent with the asserted bus/core ratio.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
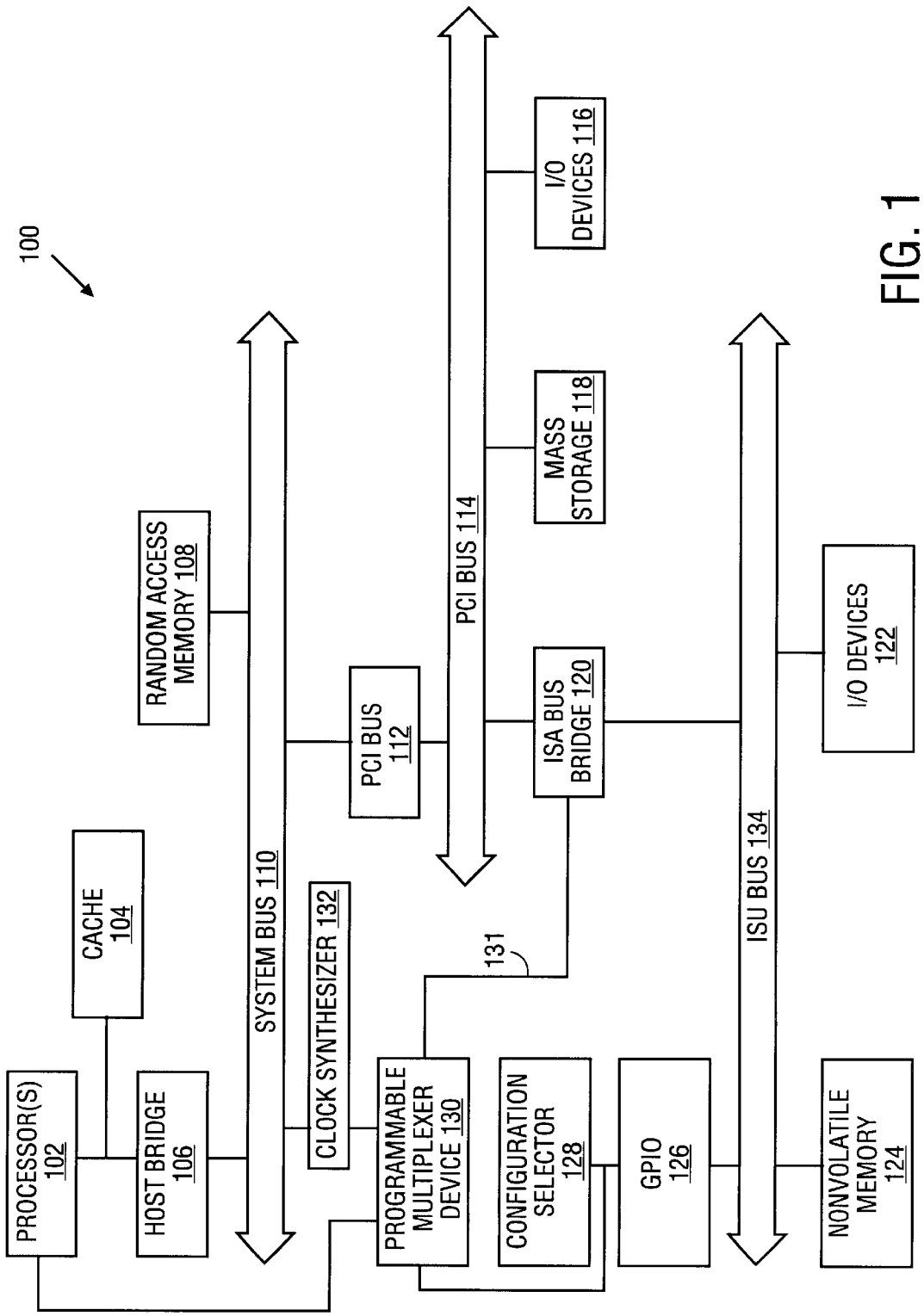
FIG. 1 is a block diagram illustrating one example of a computer system incorporating the teachings of the present invention.

Referring now to FIG. 1, a block diagram illustrating one embodiment of a computer system 100 is depicted incorporating the teachings of the present invention. In the illustrated example of FIG. 1, in accordance with the teachings of the present invention, computer system 100 is shown comprising a single configuration selector 128 which selectively places computer system 100 in one of a plurality of modes. In one embodiment, these modes include a normal mode, a configuration mode, and an update mode, wherein under the configuration mode, a number of operating parameters for computer system 100 may be set without requiring the costly and space consuming corresponding plurality of configuration selectors employed by the prior art.

In one example embodiment, the operating parameters are set by way of an innovative segmented basic input/output system (BIOS) stored within nonvolatile memory 124. The operating parameters include the operating parameters of clock synthesizer 132, the operating parameters of processor (s) 102, and the operating parameters of other configurable devices employed to form computer system 100, not depicted. Thus, in accordance with the illustrated example embodiment of FIG. 1 the operating parameters for computer system 100 may be set with the selective configuration of a single configuration selector 128 communicatively coupled to nonvolatile memory 124 having stored therein an innovative segmented BIOS, through ISA bus 134, the detail of which will be described in further detail with reference to FIGS. 2–7.

As illustrated in the example embodiment of FIG. 1, processor(s) 102 and cache 104 are coupled to system bus 110 through host bridge 106. In addition, random access memory 108 and clock synthesizer are coupled to system bus 110, as depicted. In one embodiment, bridge 112 is coupled to system bus 110 for coupling system bus 110 to one or more, typically input/output (I/O) buses. In one embodiment, the I/O bus is a Peripheral Component Interconnect (PCI) bus 114, and bridge 112 is a system to PCI bus bridge. In the illustrated example, system to PCI bus bridge 112 couples system bus 110 to PCI bus 114. In one embodiment, mass storage device 118 such as a magnetic or optical disk is coupled to PCI bus 114 for storing information and instructions for processor 102. In one embodiment, I/O devices 116 are coupled to PCI bus 114 which input and output data and control information to and from processor 102. Common examples of such I/O devices 116 may include a display device, an alphanumeric input device including alphanumeric and function keys, and a cursor control device. In one embodiment, a hard copy device such as a plotter or printer may also be included in the devices cumulatively referred to as I/O devices 116 for providing a visual representation of computer images. In one embodiment, a network adapter device may be included in the I/O devices 114 for coupling computer system 100 to a computer network, such as a Local Area Network (LAN).

In the illustrated embodiment of FIG. 1, PCI bus 114 is coupled to another, typically I/O, bus via bus bridge 120. In one embodiment, PCI bus 114 is coupled to Industry Standard Architecture (ISA) bus 134 via PCI to ISA bus bridge 120. In one embodiment, a nonvolatile memory is coupled to ISA bus 120 for storing information and instructions for processor 102, e.g., nonvolatile memory 124. In the illustrated example embodiment, nonvolatile memory 124 is a flash memory device (e.g., flash electronically erasable programmable read only memory (flash EEPROM)). Of course, those skilled in the art will appreciate that other nonvolatile memory devices such as an electrically programmable read only memory (EPROM), or an EEPROM or $E^2PROM$ may also be used.

In accordance with the teachings of the present invention, nonvolatile memory 124 stores a plurality of instructions for implementing a segmented basic input/output system (BIOS) having a plurality of functions which controls the input/output services and the start-up (a.k.a., boot) process of computer system 100. One example configuration of nonvolatile memory 124 is presented in the illustrated example embodiment of FIG. 7, and will be described in further detail below.

Continuing with FIG. 1, in one embodiment of computer system 100 I/O devices 122 are coupled to ISA bus 134, which input and output data and control information to and from processor(s) 102. I/O devices 122 may, for example, include some of the same devices as illustrated in I/O devices 116 discussed above. In one embodiment, PCI to ISA bus bridge 120 is configured to communicate with programmable multiplexer device 130 (also referred to as a programmable configuration selector). As depicted, programmable multiplexer device 130 is also coupled to configuration selector 128. In one embodiment, programmable multiplexer device 130 is a "4-bit 1-Of-2 $I^2C$ Multiplexer" device communicatively coupled to PCI to ISA bus bridge 120 as depicted. A more detailed description of the operation of programmable multiplexer 130 is provided in the parent application, and a more detailed description of its operation within the present invention will be provided below, with reference to the illustrated example embodiment of FIG. 2.

As will be appreciated by those skilled in the art, except for the innovative configuration of computer system 100 operating parameters with a single configuration selector 128 in concert with the complementary BIOS stored within nonvolatile memory 124, elements 102 through 134 perform their conventional function as known in the art. In addition, except for I/O devices 116 and 122, and mass storage device 118, elements 102–134 of computer system.100 are disposed on circuit board assembly (although the invention is not so limited in scope in this respect).

Figure 2:
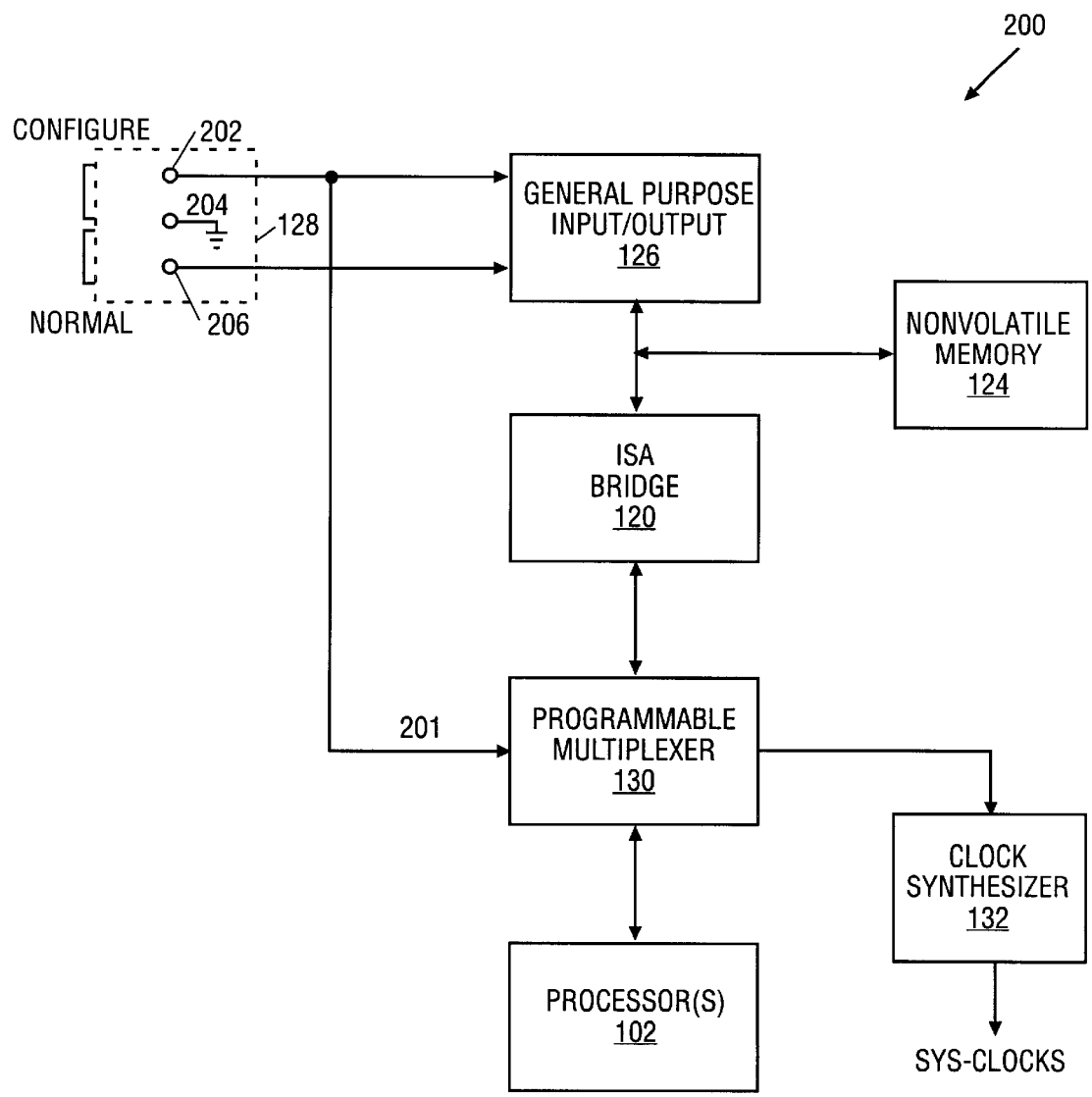
FIG. 2 is a block diagram illustrating the hardware components of the present invention, in accordance with one embodiment of the present invention.

Turning next to FIG. 2, a block diagram illustrating the interrelation of elements incorporating the teachings of the present invention to effect the selective configuration of example computer system 100 is depicted. In the illustrated example embodiment, single configuration selector 128 is depicted coupled to a general purpose input/output device 126 having a plurality of general purpose inputs and a plurality of general purpose outputs. One example of a general purpose input/output device suitable for this application is a Super I/O™ device, commonly available from National Semiconductor, of Santa Clara, Calif. Those skilled in the art will appreciate, however, that suitable alternatives exist. As illustrated in the example embodiment of FIG. 2, configuration selector 128 is communicatively coupled to nonvolatile memory 124 via general purpose input/output device 126 and ISA bus 134. In addition, configuration selector 128 is coupled to programmable multiplexer device 130, and a plurality of other configurable devices (e.g., clock synthesizer 132 and processor(s) 102) via general purpose input/output device 126, PCI to ISA bus bridge 120 and programmable multiplexer device 130, as depicted.

As will be discussed in greater detail below, with reference to FIGS. 3–6, programmable multiplexer 130 operates to configure the clock speed of clock synthesizer 132, as well as providing bus/core ratio information to processor(s) 102. In accordance with the teachings of the present invention, when computer system 100 is operating in configuration mode, programmable multiplexer 130 operates to configure the clock synthesizer 132 and processor(s) 102 with minimal default clock speed and bus/core ratio information that is common to a family of processors and/or buses that may be employed within computer system 100, thereby ensuring a nominal level of functionality without apriori knowledge of the particular processor/bus employed in computer system 100. While operating in the normal mode, programmable multiplexer 130 asserts programmed clock speed and bus/core ratio information, in accordance with the clock speed and bus/core ratio information programmed into the programmable multiplexer 130. A detailed description of the programming and operation of programmable multiplexer 130 is found in the incorporated by reference parent application. A more detailed description of the operation of programmable configuration selector 130 within the context of the present invention is presented below with reference to Table 1 and FIGS. 3–6, below.

With continued reference to the illustrated example embodiment of FIG. 2, configuration selector 128 is a jumper block assembly having a header with three posts 202, 204 and 206, and a jumper capable of coupling any adjacent two of the three posts (e.g., posts 1 and 2, or posts 2 and 3). As depicted, center post 204 (post 2) is tied to the ground of computer system 100. Therefore, using the jumper to couple any two of the three posts will tie either first post 202 or third post 206 to second post 204 (e.g., ground). Consequently, in accordance with the illustrated example embodiment, the selective configuration of configuration selector 128 denotes one of three available operating modes for computer system 100. In one embodiment, for example, the selective configuration of configuration selector 128 alternatively places computer system 100 into normal mode, update mode, or configuration mode, incorporated with the teachings of the present invention. A summary of the correlation between the state of configuration selector 128, the mode of operation, and the output signal of programmable multiplexer 130 is depicted in Table 1, below.

TABLE 1

System Operationl Mode Denoted By Single Configuration Selector

| Configuration Selector Settings | | Operational Mode | Programmable Multiplexer Output |
|---|---|---|---|
| 0 | 0 | Reserved | Default Settings |
| 0 | 1 | Configuration mode | Default Settings |
| 1 | 0 | Normal Mode | Programmed Settings |
| 1 | 1 | Update Mode | Programmed Settings |

As illustrated in Table 1, in accordance with one example embodiment of the present invention, when the jumper of configuration selector 128 couples first post 202 to second post 204, the segmented BIOS will operate in Configuration mode, and programmable multiplexer 130 outputs a default clock speed and bus/core ratio information common to a family of processors and buses that may be employed within computer system 100. As will be described in greater detail below, in one embodiment, the default clock speed and bus/core ratio information configures clock synthesizer 132 to provide the slowest clock speed and lowest bus/core ratio supported by processor(s) 102. When the jumper of configuration selector 128 couples third post 206 to second post 204, the BIOS will operate in Normal Mode, and programmable multiplexer 130 will output programmed clock speed and bus/core ratio information that is particularly suited to the actual processor and bus employed by computer system 100. Otherwise, if the jumper does not couple any two of the three posts 202–206 of configuration selector 128, the segmented BIOS will operate in Update Mode, and programmable multiplexer 130 will output programmed clock speed and bus/core ratio information.

Figure 3:
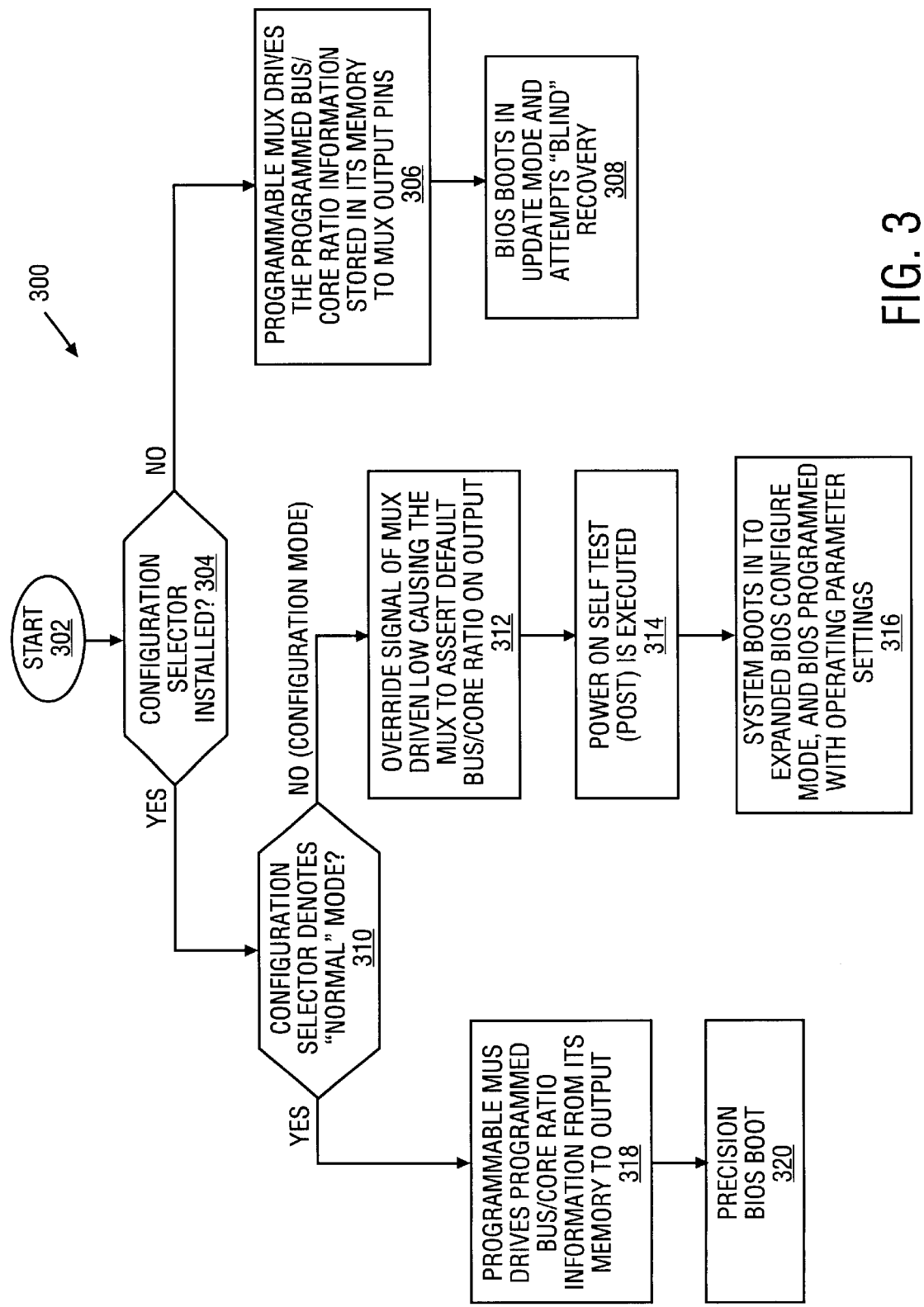
FIG. 3 is a flow chart illustrating one example of the method steps for implementing a segmented basic input/output system (BIOS), in accordance with one embodiment of the present invention.
Figure 4:
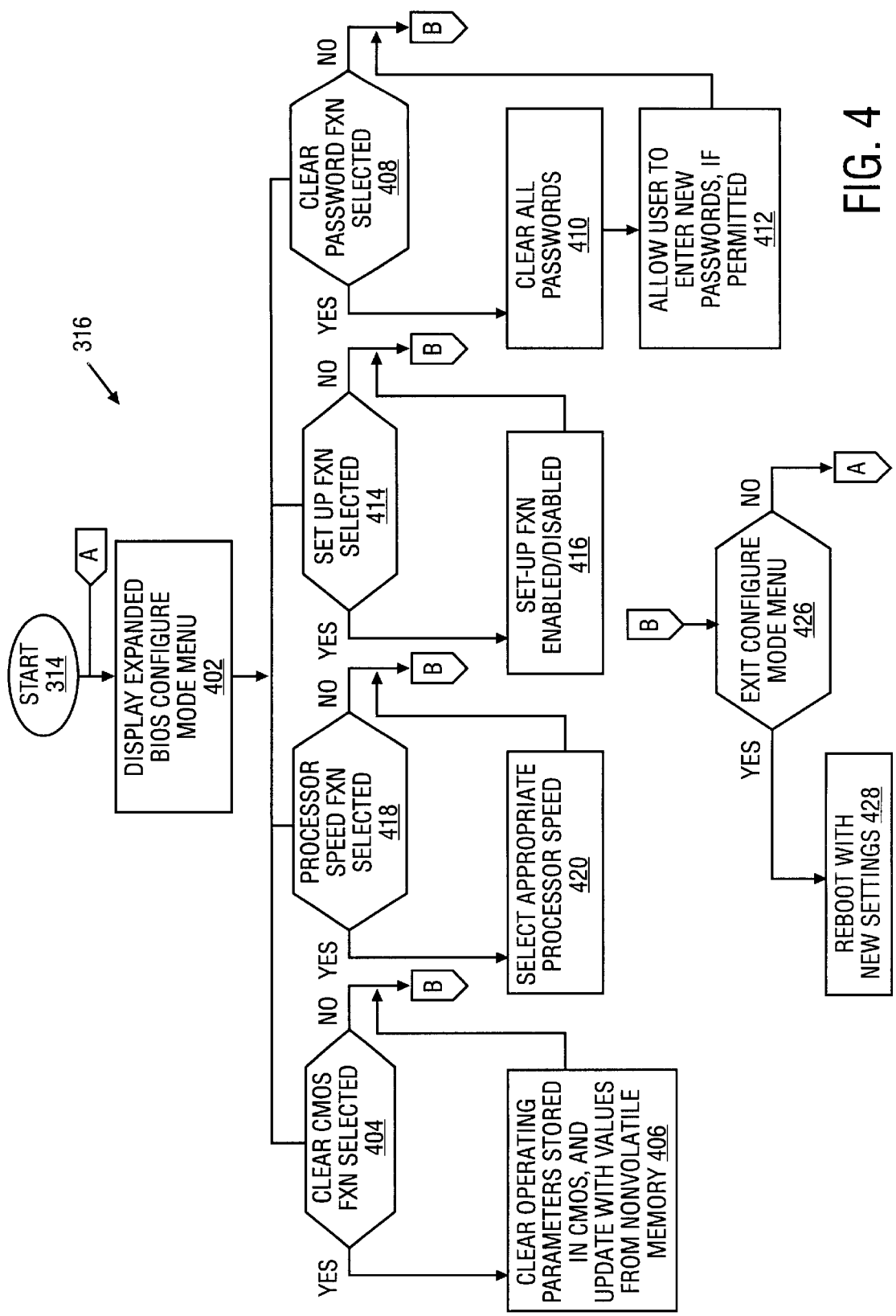
FIG. 4 is a flow chart illustrating one example of the method steps for a BIOS operating in configuration mode, in accordance with the teachings of the present invention.
Figure 5:
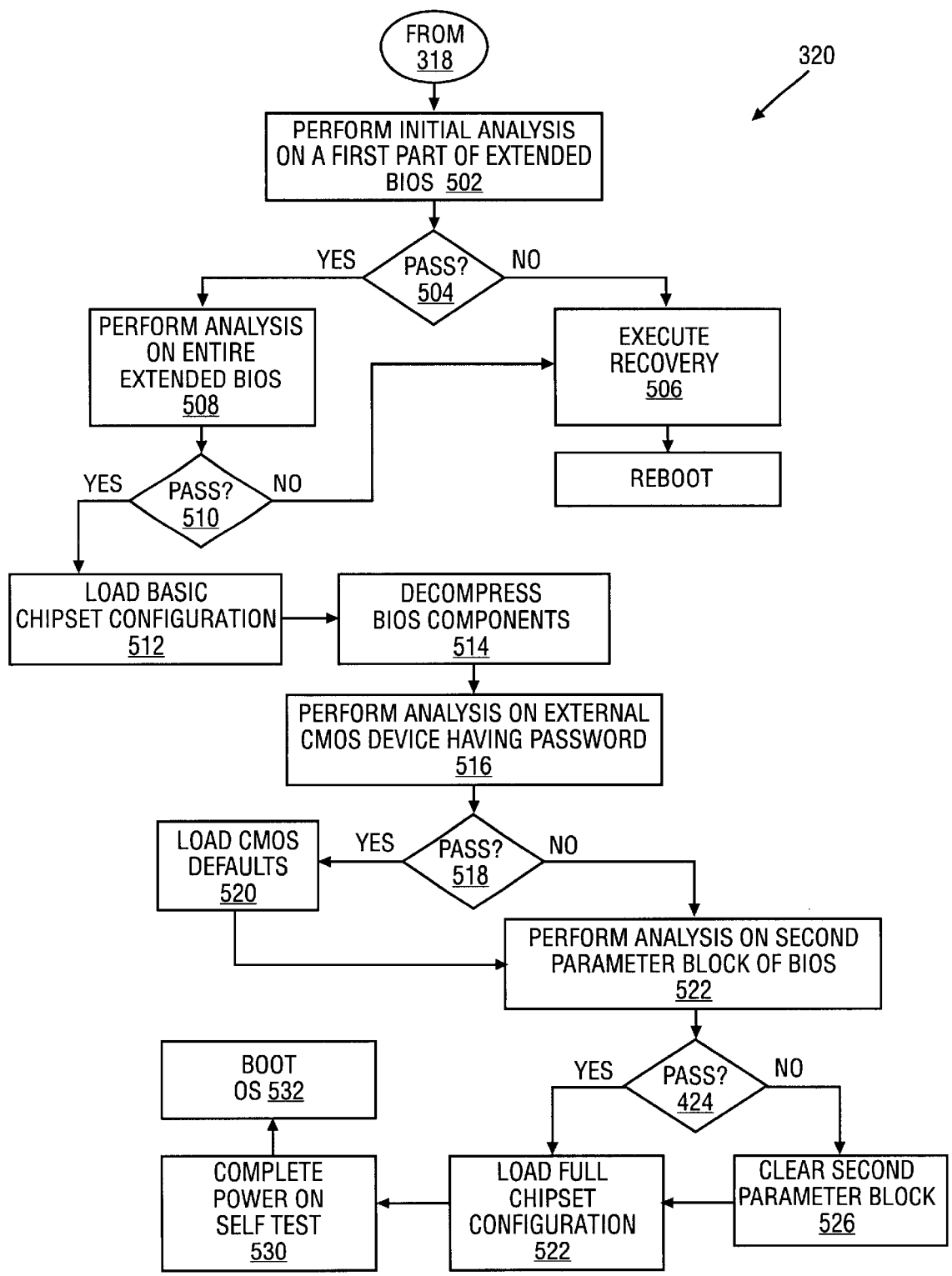
FIG. 5 is a flow chart illustrating one example of the method steps for a BIOS operating in normal mode, in accordance with the teachings of the present invention.
Figure 6:
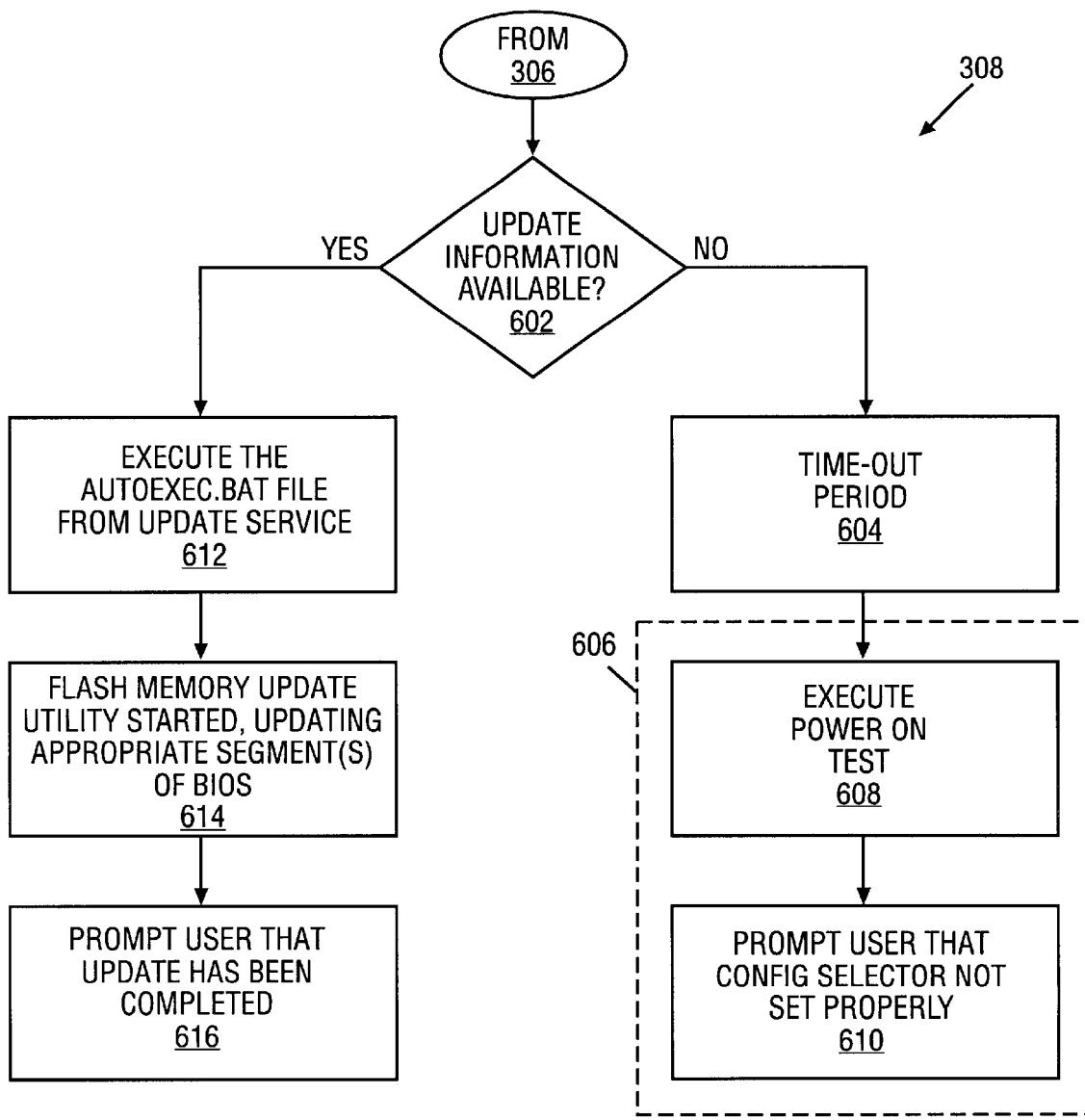
FIG. 6 is a flow chart illustrating one example of the method steps for a BIOS operating in an update mode, in accordance with the teachings of the present invention.

Having generally described the hardware elements of the present invention in FIGS. 1 and 2, above, the operation of the present invention will be further described with reference to FIGS. 3 through 7. FIG. 3 provides a flow chart illustrating one example of the method steps for implementing a complementary BIOS for setting the operating parameters of the computer system, thereby reducing the number of configuration selectors required to configure computer system 100, in accordance with one embodiment of the present invention. FIGS. 4 through 6 illustrate one example of the method steps for implementing the different operating modes of the BIOS illustrated in FIG. 3, while FIG. 7 provides a graphical representation of the memory elements of one example of nonvolatile memory 124 having stored therein the BIOS described in FIGS. 3 through 6.

Figure 7:
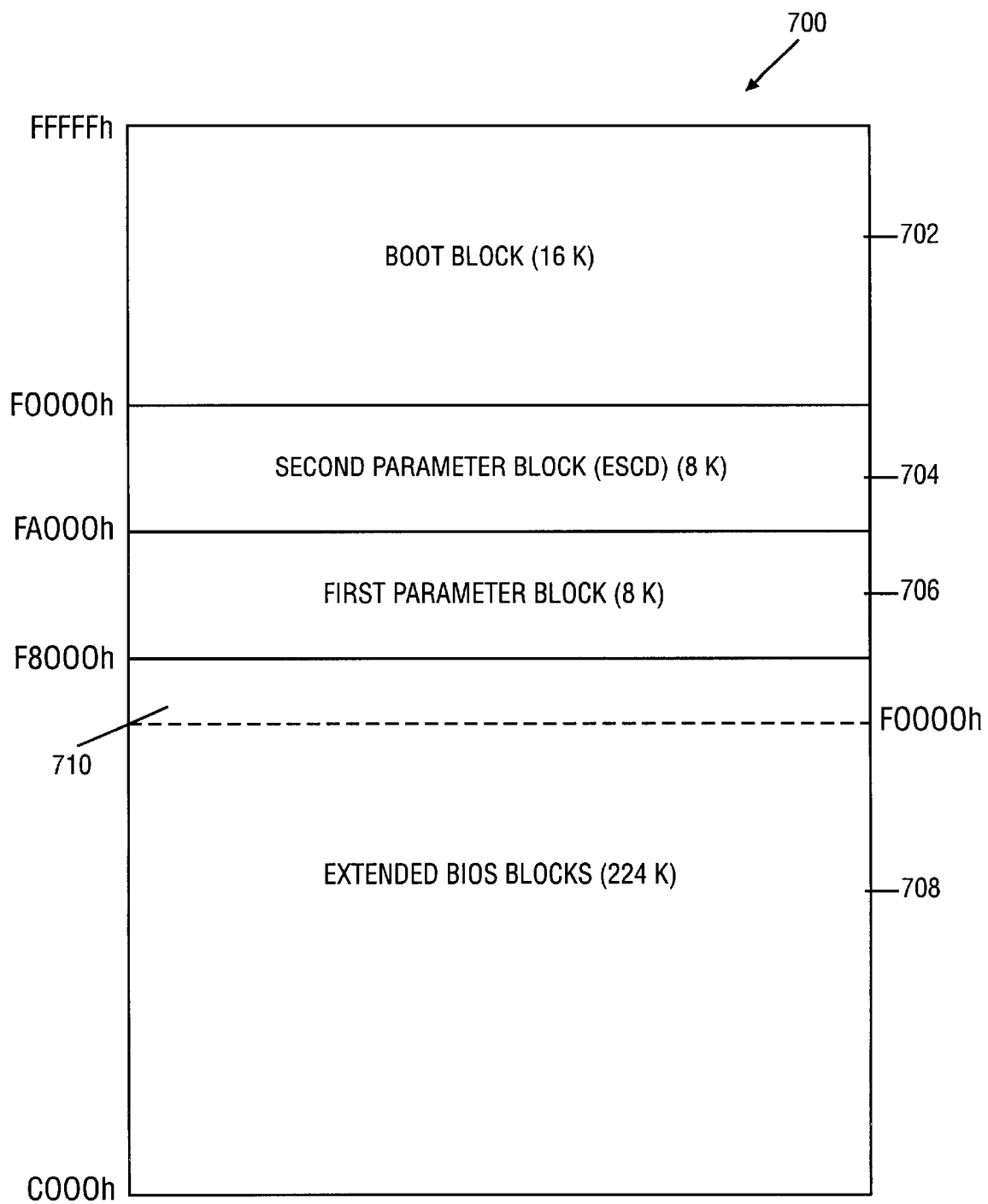
FIG. 7 is a graphical representation of one example of a memory device having stored therein the segmented BIOS of FIG. 3, in accordance with the teachings of the present invention.

Before delving into the detailed description of the method steps of FIGS. 3 through 6, however, reference is made to FIG. 7 wherein a graphical illustration of one example of a memory map for nonvolatile memory 700 is presented. In one embodiment, nonvolatile memory 700 is beneficially incorporated into computer system 100 as nonvolatile memory 124. In one embodiment, nonvolatile memory 700 has stored therein a segmented BIOS. As depicted in the illustrated example of FIG. 7, the segmented BIOS is shown comprising boot block 702, second parameter block 704, first parameter block 706 and an extended BIOS block 708. In the illustrated embodiment, the segmented BIOS is stored within 256K of nonvolatile memory 700 from storage element C0000hex to FFFFFhex. Those skilled in the art will appreciate, however, that BIOS's come in a number of sizes, and may well be stored anywhere within the nonvolatile memory.

As illustrated within the example embodiment of FIG. 7, boot block 702 represents a static portion of the BIOS comprising fundamental elements of the BIOS that will not change over time. As computer system 100 is turned on or reset, the "boot" process begins by accessing boot block 702, which initiates and executes the rest of BIOS (in the remaining segments) (as will be discussed below) and subsequently boots an operating system (OS). In one embodiment, boot block 702 is a 16 Kb block of nonvolatile memory 700 stored in elements FC000hex to FFFFFhex. In the illustrated embodiment of FIG. 7, boot block 702 is not writeable. That is, in accordance with one embodiment of the present invention, during an update procedure (described more fully below) wherein the flash memory denoted by nonvolatile memory-124 is "reflashed"(e.g., electrically erased and reprogrammed), boot block 702 remains unchanged. In alternate embodiments, however, the entire BIOS may be "reflashed".

Continuing with the illustrated embodiment of nonvolatile memory 700, second parameter block 704 is an 8 Kb block of nonvolatile memory 700 stored in elements FA000hex to FBFFFhex. In one embodiment, second parameter block 704 has stored therein the BIOS parameters relating to the Extended System Configuration Data (ESCD). In one embodiment, the ESCD includes configuration information regarding computer system 100 peripheral cards and components. In one embodiment, the ESCD includes information regarding peripheral cards and components conforming to the Plug-N-Play™ interface protocol. In one embodiment, first parameter block 706 is an 8 Kb block of nonvolatile memory 700 stored in elements F8000hex to F9FFFhex.

In the illustrated embodiment of FIG. 7, extended BIOS block 708 is a 224 Kb block of memory which extends from memory element C0000hex to F7FFFhex of nonvolatile memory 700. In one embodiment, the majority of the BIOS is stored within extended BIOS region 708. Also depicted in FIG. 7 is segment 710 a 32 Kb block of memory which extends from memory element F0000hex to F7FFFhex of extended BIOS block 708. In one embodiment, a memory map for nonvolatile memory 700 is partially stored within segment 710.

Turning next to FIG. 3, a flow chart illustrating one example of the method steps of a BIOS begins in step 302 where computer system 100 boots upon initial power-up, or upon system reset. In either case, computer system 100 performs the same boot process in powering up computer system 100 to a point where a user may utilize the system. During the boot process of computer system 100 incorporated with the teachings of the present invention, nonvolatile memory 124 receives the output signal of configuration selector 128 denoting the operating mode via general purpose I/O 126. In step 304, a determination is made as to the state of configuration selector 128, e.g., whether a jumper has been installed, and if so over which posts 202 and 204, or 204 and 206.

If in step 304 it is determined that a jumper has been installed, a further determination is made in step 310 to determine whether the jumper has been installed to configure configuration selector 128 to denote the normal mode or the configuration mode. If in step 310 it is determined that configuration selector 128 is denoting configuration mode (e.g., for Table 1, above, "01"), programmable multiplexer 130 drives a default set of clock synthesizer and bus/core ratio information to clock synthesizer 132 and processor(s) 102, as described above with respect to FIG. 2. In one embodiment, when in configuration mode override# input 201 of programmable multiplexer 130 is driven low which drives the output pins of programmable multiplexer 130 to ground (e.g., all "0's"), thereby configuring clock synthesizer 132 and processor 102 to operate at the lowest clock speed and bus/core ratio for the processor/bus family, step 312.

In step 314, power on self-test (POST) is executed. In one embodiment of the present invention, while in configuration mode, complementary BIOS relies on the default CMOS settings, and not the user CMOS settings (to be described more fully below) to check out and configure computer system 100 during POST. In one embodiment, POST may include an exhaustive memory test, a configuration of bootable devices (e.g., display), configuration of the keyboard, catalog installed peripherals and programming of the chip set and particular reserved memory regions.

Having completed POST, step 314, computer system 100 boots into an expanded BIOS set-up mode, wherein the user configures the BIOS with a plurality of computer system operating parameters via a graphical user interface (GUI), step 316, which are asserted to configure the operating parameters of computer system 100 when the BIOS is booted in normal mode (to be discussed in greater detail, below). The beneficial programming of the BIOS with operating parameters asserted when computer system 100 is operating in normal mode, without requiring additional configuration selectors, reduces the need for a plurality of costly configuration selectors to serve the same function. Thus, in accordance with the teachings of the present invention, the number of configuration selectors required may be reduced to a single configuration selector, e.g., configuration selector 128.

Alternatively, if in step 310 configuration selector 128 has been configured to denote normal mode (for Table 1, above, "10"), programmable multiplexer 130 asserts a signal on its output pins representing programmed clock speed and bus/core ratio values retained in its memory, thereby configuring clock synthesizer 132 and processor 102 to operate at a speed particularly suited to the particular processor/bus combination employed by computer system 100, step 318. As indicated above, the method and apparatus wherein programmable multiplexer 130 is programmed with clock speed and bus/core ratio values is described in the parent application. In step 320, the BIOS continues with precision boot process of the normal mode, described in greater detail below with reference to FIG. 5.

Returning to step 304, if a jumper is not installed on configuration selector 128 (for Table 1, above, "11") computer system 100 is configured to operate in update mode. In update mode, programmable multiplexer 130 asserts a signal on its output pins representing programmed clock speed and bus/core ratio values retained in its memory, thereby configuring clock synthesizer 132 and processor 102 to operate at a speed particularly suited to the particular processor/bus combination employed by computer system 100, step 306. In step 308, the BIOS next attempts to perform a "blind" recovery within update mode. A "blind" recovery is referred to as "blind" because the BIOS does not discriminate between corrupted and uncorrupted segments of the BIOS stored in nonvolatile memory 124, but executes a full reflash of all relevent segments of the BIOS stored in nonvolatile memory 124. As will be described in greater detail below, a full reflash of all relevent segments of the segmented BIOS includes the extended BIOS blocks 708 and the first parameter block 706, while the boot block 702 and the second parameter block 704 are left unchanged. In one embodiment, the vital product data (VPD) and the extended system configuration data (ESCD) are stored within the second parameter block 704. In one embodiment, while in a precision recovery, the ESCD may be cleared if it is determined that the ESCD is corrupted. The blind recovery and the precision recovery processes of the update mode will be described in greater detail with reference to FIG. 6.

Thus, with the illustrated example embodiment of FIG. 3, complementary BIOS operation within the three modes of operation has been generally described. Each of the particular functions will next be described in greater detail with reference to FIGS. 4, 5 and 6.

Turning to FIG. 4, BIOS operation within the configuration mode will be developed within the context of FIGS. 1, 2 and 7. As illustrated, FIG. 4 depicts the method steps of one example of BIOS operation within the configuration mode, in accordance with but one example embodiment of the present invention. Recall, in step 314 of FIG. 3, that power-on self test (POST) has been executed, thus making the keyboard and the display device (not shown) available to the user via the I/O ports. Accordingly, in step 402, a menu or other GUI for the expanded BIOS set-up mode is displayed, prompting the user of computer system 100 with a number of configurable options for a plurality of operating parameters. In accordance with the illustrated example embodiment of FIG. 4, one such function allows the user to clear the settings of the external CMOS device, step 404. If selected, the settings of the CMOS device are cleared and loaded with default settings (available from nonvolatile memory), step 406. In one embodiment, the passwords stored in the CMOS device are preserved.

In step 408 of the illustrated example embodiment, the user is provided with the option of clearing system passwords. If selected, all system passwords are cleared in step 410. In one embodiment, an opportunity for the user to enter new system passwords is subsequently provided, step 412. In an alternate embodiment, user passwords are programmed via the OS, and not via the BIOS step 412. In either instance, in accordance with the illustrated embodiment of FIG. 4, if a user forgets the system password and would otherwise be "locked out" of computer system 100, the user may shut down computer system 100, move single configuration selector 128 to the configuration mode, and restart computer system 100 in the configuration mode which provides the user with a menu option to clear the system passwords.

In step 414, the user is provided with a set-up enable/disable function. In one embodiment, the set-up enable/disable function determines whether a user of computer system 100 will be allowed to enter a BIOS set-up mode while the computer boots in the normal mode of operation, step 416. In one embodiment, when enabled, the set-up function allows a user to enter a BIOS set-up mode by pressing a function key while the computer system boots, prior to execution of the OS, wherein the user can selectively configure a number of the plurality of operating parameters.

In accordance with one embodiment of the present invention, a user is provided with the option of specifying the processor speed for processor 102 of computer system 100, step 418. If selected, the user selects the speed of the processor from list of possible speeds associated with the family of processors used to form computer system 100, step 420.

As illustrated in FIG. 4, the user also has an option to exit the configuration mode, step 426. In one embodiment, if the "end" function is selected, the user is instructed that computer system 100 is about to be shut down, and that the user should reconfigure configuration selector 128 to the "normal" position (e.g., position "10" in accordance with Table 1, above). The user then reboots the BIOS with the new configuration settings, step 420. Although a number of particular operating parameters have been referred to in the development of the example embodiment of FIG. 4, those skilled in the art will appreciate that these are merely illustrative examples and not necessarily an exhaustive list of operating parameters that may be set via the BIOS configuration mode. That is to say, additional parameters may be added, or parameters may be deleted from the configuration menu of the example embodiment of FIG. 4 without deviating from the spirit and scope of the present invention.

Turning next to FIG. 5, the normal mode of operation and, in particular, the precision BIOS boot process generally referenced by step 320 will now be described in the context of FIGS. 1, 2 and 7. As alluded to above, the precision BIOS boot process of the normal mode is referred to as such because the BIOS analyzes and verifies the integrity of a number of separate segments of the BIOS during the boot process, "reflashing" only those segments of memory that have been identified as corrupted. Accordingly, the BIOS is able to identify those segments of memory, if any, where corruption of the BIOS segments exists and reflashes only those segments.

In accordance with the illustrated example embodiment of FIG. 5, the precision boot process of the normal mode begins in step 502 where an initial analysis or verification of a first segment of the BIOS is performed. In one embodiment, the BIOS executes a BIOS verification function. In one embodiment, the verification function is comprised of a checksum verification of the integrity of the memory segment. In one embodiment, the initial analysis of a first segment of the BIOS is performed within the extended BIOS region from memory elements F0000hex to F7FFFhex, denoted in FIG. 7 as segment 710. In accordance with the illustrated example embodiment, as alluded to above, a memory map for nonvolatile memory 700 is at least partially located within memory segment 710. Consequently, in accordance with the illustrated example, an initial analysis of memory segment 710 provides an indication of the integrity of memory map for nonvolatile memory 700.

In step 504, a determination is made as to whether the first segment of BIOS is corrupted. In one embodiment, if the first segment of BIOS is corrupted, the boot process executes a "precision" recovery of the corrupted segment from within the update mode, step 506. Unlike the "blind" recovery initiated from the update mode where a full reflash of all relevant segments of the segmented BIOS of nonvolatile memory 700 is "reflashed", the "precision" recovery within the update mode of step 506 merely "reflashes" those memory segments that have been identified as corrupted, in this case, memory segment 710. The method steps of the update mode will be described in greater detail below with reference to FIG. 6. In an alternate embodiment of the present invention, rather than immediately initiating the "precision" recovery of the update mode (step 506), the segmented BIOS "catalogs" the corrupted memory segment and continues with the analysis of additional memory segments until all memory segments have been analyzed and corrupted segments cataloged, whereupon the "precision" recovery of the update mode is initiated to "reflash" all cataloged corrupted memory segments. In yet another embodiment of the present invention, insofar as memory segment 710 of nonvolatile memory 700 contains at least a partial memory map of nonvolatile memory 700, if an initial analysis of this segment fails, a full reflash of all relevant segments of the BIOS is executed.

Returning to-step 504, if the initial analysis of the first memory segment of BIOS is not corrupted (i.e., the chksum passed), or if the BIOS is merely cataloging corrupted memory segments, an analysis is performed on the remaining memory elements C0000hex to EFFFFhex of extended BIOS block 708, step 508. In step 510, a determination is made as to whether the remaining memory elements of extended BIOS block 708 are corrupted. In one embodiment, if the remaining memory elements comprising the extended BIOS region 708 are corrupted, the "precision" recovery of the update mode is executed. In an alternate embodiment, the memory segment is merely "cataloged" as corrupted for future "precision" recovery, as described above. If, in step 510, the analysis of the remaining elements comprising the extended BIOS region are not corrupted, a basic chipset configuration is loaded, step 512, which allows the boot process to continue and verify additional elements of nonvolatile memory 700 comprising the segmented BIOS.

In one embodiment, wherein the BIOS components have been compressed to minimize the storage space required to store the BIOS, the precision boot process while operating in the normal mode continues with the decompression of remaining BIOS components, step 514. Having decompressed the remaining BIOS components, step 514, or if no decompression is required, an analysis of the integrity of information stored in an external CMOS device is performed, step 516. In one embodiment, the external CMOS device has stored therein BIOS set-up configuration information necessary to complete execution of the BIOS. If, in step 508, it is determined that the CMOS device is corrupted, the CMOS is loaded with default parameters from nonvolatile memory via BIOS, step 520.

If the CMOS device passes the analysis of step 516, or upon loading the CMOS device with default settings, an analysis is next performed on the integrity of information stored in second parameter block 704, step 522. In step 524, a determination is made as to whether the Extended System Configuration Data (ESCD) of the second parameter segment 704 is corrupted. If it is determined in step 524 that the ESCD of the second parameter block 704 is corrupted, that portion of the second memory block 704 is cleared. In one embodiment, second parameter block 704 will be reconfigured with Extended System Configuration Data for peripheral components from system memory (e.g., RAM 108) as computer system 100 is shut down. In an alternate embodiment, second parameter block 704 is reconfigured with ESCD prior to booting the OS, step 532. If, in step 524 it is determined that the ESCD of second parameter block 704 is not corrupted, the basic chipset configuration loaded in step 512 is replaced with a full chipset configuration, step 528. Having loaded the full chipset configuration, step 528, POST testing is completed on the full chipset, step 530, and the operating system (OS) is loaded and executed, step 532.

Thus, once the OS is loaded and executed in step 532, computer system 100 of FIG. 1 incorporated with the teachings of the present invention, is ready for use having been configured with operating parameters using a single configuration selector 128 and a complementary BIOS, thereby reducing the number of costly configuration selectors required of the prior art systems.

With reference now to the illustrated example of FIG. 6, the operation of BIOS under the update mode will be described in the context of FIGS. 1, 2 and 7. As depicted in the example embodiment of FIG. 6, a flow chart illustrating the method steps for BIOS operation while computer system 100 is in update mode, is shown. Recall from the illustrated example embodiment of FIG. 3 that computer system 100 enters update mode in one of two ways. First, if configuration selector 128 is set to configure computer system 100 to operating in update mode (for Table 1, above, "11"), a "blind" recovery from within the update mode is executed, wherein a full reflash of all relevant segments of the writeable area (e.g., memory segments 704, 706, 708) of nonvolatile memory 700 are "reflashed". Second, if corrupted segment(s) of BIOS are identified during the precision BIOS boot process under the normal mode of computer system 100 operation, only those segment(s) determined to be corrupted are "reflashed". In either case, the "blind" recovery and the "precision" recovery of the update mode are identical, save for the size of the memory being "reflashed". One example of the update mode incorporating the teachings of the present invention is illustrated in the method steps of FIG. 6.

As illustrated in the example embodiment of FIG. 6, the update mode begins with, in step 602, a determination as to whether update information is available. In one embodiment, the update information is configuration information stored on a machine readable medium with a predetermined filename. In the illustrated example embodiment of FIG. 6, the update information is available as a data file on a floppy that is inserted into an available disk drive of computer system 100. In alternate embodiments of the present invention, the update information is made available during update mode from a remote source (e.g., a hard disk, or a network element). In one embodiment, if in step 602 it is determined that the update information is not available, the complementary BIOS will wait a predetermined period of time for a user of the computer system to provide the update information before timing out, step 604. Once the BIOS has timed out for lack of update information in step 604, BIOS executes a modified BIOS boot, step 606.

As depicted in the illustrated example embodiment of FIG. 6, the modified BIOS boot includes the execution of power-on self test (POST) as described above with reference to FIG. 4, step 608. Having completed POST, the modified BIOS boot concludes by prompting the user that configuration selector 128 may not be properly set, providing the user with the information necessary to make such a determination.

If, however, in step 602 it is determined that the update information is available, the recovery function of BIOS "reflashes" appropriate segments of nonvolatile memory 700 (depending upon whether it is a "blind" or a "precision" update) in the following manner. In accordance with the illustrated example embodiment of FIG. 6, BIOS operating under update mode executes a predetermined file located on the floppy drive, step 612. In one embodiment, for example, the predetermined file is an AUTOEXEC.BAT file located on a disk inserted in to the floppy drive. With the execution of the predetermined file, a flash memory update (FMUP) utility such as iFlash✓ (from Intel, Corporation) is initiated, step 614, which manages the "reflashing" of appropriate segments of the BIOS.

In accordance with the teachings of the present invention, in one instance the FMUP will indiscriminately "reflash" the relevant segments of the BIOS stored in nonvolatile memory 700 (e.g., a full reflash, or "blind" recovery). In another instance, the FMUP will discriminately "reflash" only those segments of nonvolatile memory 700 having stored therein corrupted writeable segments of the BIOS. Once the FMUP utility has completed the recovery, the user of computer system 100 will be prompted that the BIOS update has been completed, step 616, with instructions to reconfigure configuration selector 128 to denote the normal mode, and to reboot computer system 100.

Thus, alternative embodiments for a method and apparatus for setting the operating parameters of a computer system have been described. While the method and apparatus of the present invention has been described in terms of the above illustrated embodiments, those skilled in the art will recognize that the invention is not limited to the embodiments described. Thus, the present invention can be practiced with modification and alteration without departing from the spirit and scope of the appended claims. Accordingly, the foregoing descriptions thereof are to be regarded as illustrative instead of restrictive on the present invention.

What is claimed is:

1. A computer system comprising:
   a configuration selector (CS) to selectively denote an of a plurality of computer system operating modes, said plurality of computer system operating modes comprising a configuration mode; and
   a first plurality of configurable devices to be configured in response to the configuration mode being denoted by the configuration selector, the first plurality of configurable devices including
      a storage medium having stored therein a plurality of instructions to implement a basic input/output system (BIOS) equipped to operate in each of the plurality of operating modes, wherein, in the configuration mode, the BIOS is to facilitate programming of a plurality of operating parameters for a second plurality of configurable devices,
      a processor, coupled to the storage medium, to execute the BIOS, and
      a programmable multiplexer to assert a default bus/core ratio common to the first and second plurality of configurable devices when in the configuration mode.

2. The computer system of claim 1, wherein the programmable multiplexer is to assert a programmed bus/core ratio when not in the configuration mode.

3. The computer system of claim 1, wherein the second plurality of configurable devices includes the processor.

4. The computer system of claim 1, wherein the second plurality of configurable devices includes a complementary metal oxide semiconductor (CMOS) memory device.

5. The computer system of claim 4, wherein the CMOS memory device has stored therein a plurality of extended system configuration data.

6. The computer system of claim 1, wherein the storage medium is a flash memory device.

7. A machine readable medium having stored thereon a plurality of machine executable instructions, execution of said plurality of machine executable instructions to implement a method comprising:

determining whether a configuration selector of a computer system denotes a configuration mode of operation;

asserting a default bus/core ratio common to a plurality of processors and buses comprising the computer system from a programmable multiplexer if the configuration selector denotes the configuration mode of operation;

executing a basic input/output system (BIOS) equipped to operate in the configuration mode of operation by a processor at a speed consistent with the asserted bus/core ratio, the processor being coupled to a bus that also operates at a speed consistent with the asserted bus/core ratio; and facilitating user programming of the plurality of operating parameters by the BIOS operating in the configuration mode of operation.

8. A method comprising:

receiving from a configuration selector an indication of a mode of operation for a computer system, said configuration selector comprising a jumper block, and said mode of operation depending at least in part on a state of the jumper block;

asserting a programmed bus/core ratio if the configuration selector indicates a normal mode of operation; and asserting a default bus/core ratio if the configuration selector indicates a configuration mode of operation, said default bus/core ratio comprising a bus/core ratio supported by a family of processors and buses that can be used in the computer system.

9. An apparatus comprising:

a configuration selector comprising a jumper block, said configuration selector to indicate a mode of operation for a computer system depending on a state of the jumper block; and a programmable multiplexer to assert a programmed bus/core ratio if the configuration selector indicates a normal mode of operation, and to assert a default bus/core ratio if the configuration selector indicates a configuration mode of operation, said default bus/core ratio comprising a bus/core ratio supported by a family of processors and buses that can be used in the computer system.

* * * * *

UNITED STATES PATENT AND TRADEMARK OFFICE
CERTIFICATE OF CORRECTION

PATENT NO.   : 6,256,731 B1
DATED         : July 31, 2001
INVENTOR(S)  : Hall et al.

Page 1 of 1

It is certified that error appears in the above-identified patent and that said Letters Patent is hereby corrected as shown below:

Column 12,
Line 12, delete "iFlash⁴√ " and insert -- iFlash™ --.

Signed and Sealed this

Fourth Day of June, 2002

Attest:

Attesting Officer

JAMES E. ROGAN
Director of the United States Patent and Trademark Office